April 17, 1962  G. C. SEAVEY  3,030,516
TRANSPARENT CONTAINER INSPECTION
Filed Sept. 15, 1958  7 Sheets-Sheet 1

April 17, 1962 G. C. SEAVEY 3,030,516
TRANSPARENT CONTAINER INSPECTION
Filed Sept. 15, 1958 7 Sheets-Sheet 3

3,030,516
TRANSPARENT CONTAINER INSPECTION

Gordon Crowell Seavey, deceased, late of Hingham, Mass., by Edith Shirley Seavey, executrix, Hingham, Mass., assignor to Comstock & Wescott, Inc., Cambridge, Mass., a corporation of Massachusetts
Filed Sept. 15, 1958, Ser. No. 761,158
19 Claims. (Cl. 250—221)

This invention relates to inspection of transparent containers such as glass jars, and more particularly to apparatus and methods for detecting different types of flaws occurring in the walls of a container. Flaws are objectionable either because they may weaken a container, or because, in the eye of a discriminating buyer, they detract from the appearance of a packaged product and suggest that care was not taken in the manufacture of the product or its container.

For example, in the molding of a glass jar a single relatively large, horizontal lap or ridge may be formed on the wall of a jar. Or a series of fine ridges may be formed in a washboard pattern. According to previous methods a fine pencil of light directed on either imperfection will result in a scattering of light which may be detected as a serious flaw. However, a small washboard will not weaken or disfigure the jar as seriously as a horizontal lap. Therefore, it will not suffice to detect a flaw of the general class which includes, for example, washboards and horizontal laps.

Accordingly, it is an object of the invention to provide an inspection method and apparatus which will differentially detect specific types of flaws without regard to the presence of other types of imperfections or similar but harmless imperfections or variations in container shape.

According to the invention a method of differentially detecting two or more types of flaws in the wall of a transparent container comprises projecting a narrow beam of light on the container, producing relative motion between the container and the beam thereby to scan the wall with the beam, flaws of different types diverting the beam on different predeterminable paths, preventing the light diverted on one path from substantially overlapping another path, and detecting the beam diverted on said one path, thereby to detect the beam diverted by one flaw independently of the other diverted beam.

Further, according to the invention a preferred inspection apparatus comprises optical means for projecting a narrow beam of light on the container, means producing relative motion between said container and optical means thereby to scan said wall with said beam, flaws of different types diverting the beam on different predeterminable paths, at least two photoelectric detecting means, each on a different path, and means for preventing light diverted to one detecting means from reaching the other detector.

Still further according to the invention relative motion is produced between the container and projecting means, which motion is rotational about an axis and linear along said axis thereby repeatedly to scan the container wall with the beam, flaws of different types diverting the beam with different characteristics or modulations which are detected as corresponding electrical signals, and circuit means are connected to the aforesaid detecting means which pass only signals with selected characteristics or modulations, thereby differentiatlly to detect one type of flaw.

Figure 1:
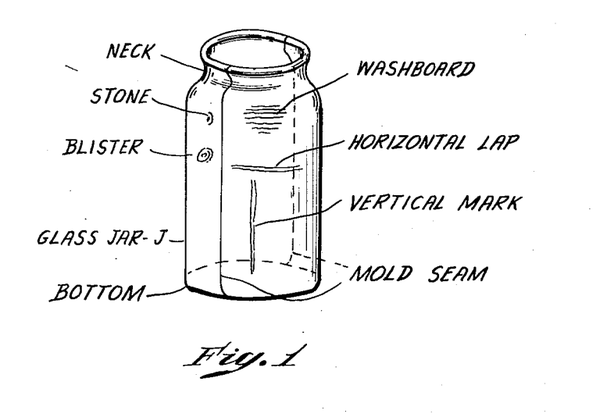
FIG. 1 is an isometric view of a jar illustrating several flaws.
Figure 2:
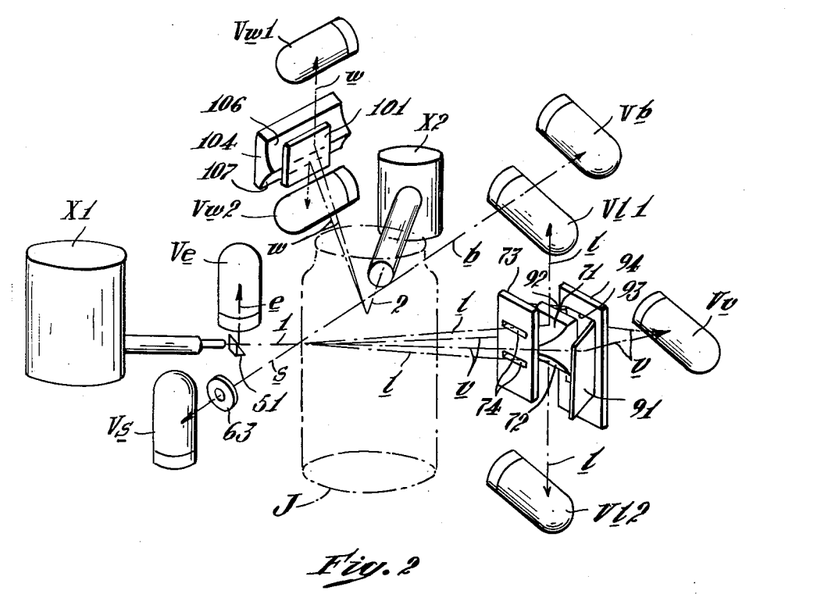
FIG. 2 is a schematic view showing the method of detecting the several flaws.

For the purpose of illustration a typical embodiment of the invention is shown in the accompanying drawing in which:

FIGS. 1 and 2 illustrate five common undesirable imperfections in a glass jar J and the way in which they divert, that is reflect or refract, an incident light beam 1 or 2. The five flaws are a stone, a blister, a horizontal lap, a washboard, and a vertical mark.

A stone is a small fragment of opaque material such as grey, unfused silica, embedded in or near the surface of the glass wall so as to form a lenticular area which reflects incident light through a wide angle (e.g. 90°) including, for example, the path $s$ of FIG. 2.

A blister is a superficial or internal air bubble or defect causing a bulge in the wall of the jar which acts as a lens or prism refracting light through a wide angle, the extent of which includes the path $b$. Light on the path $b$ is more intense than that which is transmitted by a stone, and scattered in a cone rather than in a horizontal or vertical zone, as is the case with the following defects.

A horizontal lap is a single horizontal crease of varying length on the outside of the wall. Acting like a cylindrical lens it refracts the incident beam on either or both of two small, vertical angles indicated by the paths $l$. It will be understood that the terms vertical and horizontal are used with reference to a jar normally disposed as shown, and that other orientations are possible depending on the disposition of the jar.

A washboard is a series of several closely spaced external wrinkles each resembling a lap in that the incident light is weakly refracted into a vertical zone including two small vertical angles W. The washboard as a whole however differs from a horizontal lap in that the wrinkles are repeated.

A vertical mark is like a lap, but, as the term implies, extends vertically or axially of the container, and refracts light in a horizontal zone including two small horizontal angles $v$. It differs from the vertical mold seams in that these occur twice, 180° apart on the circumference of the container whereas the mark occurs only once or at random spacing.

Other minor defects such as constrictions at the neck of the container and variations in wall thickness will refract the incident beam with some scattering of the beam and must be distinguished from the five specific flaws.

Figures 3, 4, 6:
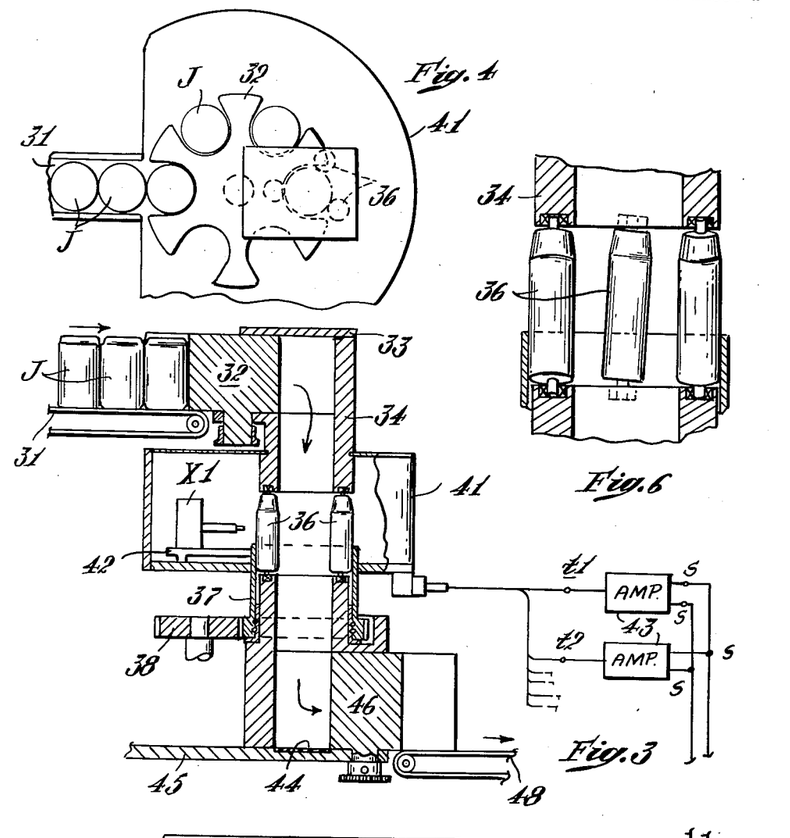
FIG. 3 is a vertical section of an automatic jar feeding and inspection machine.
FIG. 4 is a partial top plan view of the machine of FIG. 3.
FIG. 6 is a detail in elevation of the jar feeding machine.

In the feeding apparatus, shown in FIGS. 3 to 6, jars J are conveyed along a belt 31 to an entry star wheel 32 which rotates through a hood 33. The hood 33 covers a light-tight chute 34 into which the jars drop successively down to rubber rolls 36. The rolls are spaced sufficiently closely to arrest and grip each jar, and are inclined at a slight angle to the vertical to impart both a rotary and a downward motion to each jar. As shown in FIG. 3, the rolls 36 are driven by a collar 37 frictionally engaging the rolls and driven by a gear 38. The rolls may be driven by other means such as a gear drive. The rolls 36 spin the jars at about 2000 r.p.m. and feed them downward at about 0.05 inch per revolution so that somewhat less than 50 jars per minute are fed through the rolls. Of course, the jars may be driven at faster or slower rates of spin and linear feed as may be desirable or necessary.

At the rolls 36, the chute 34 opens into a dark chamber 41 which encloses a chassis 42 carrying electro-optical inspection apparatus to be described fully. In the inspection station the flaws are detected and resultant electronic signals transmitted to amplifying and control circuits 43.

After passing the rolls the jars drop onto a cushion 44 on a base 45 at the bottom of the chute and within an exit star wheel 46. The exit star wheel carries the jars past a rejection mechanism, shown for simplicity as a trap door in the base 45, and thence to a belt conveyor 48. The amplifier circuits 43 control a time delay device 49 which allows for the transit time between the rolls 36 and the trap door 47, so that when a jar with a detected defect reaches the trap door, the time delay device permits energization of a relay 50 controlling the trap door or other rejection device. Jars having defects detected at the inspection station are thus removed from the series delivered to the exit conveyor 48.

The inspection station at the spin rolls is shown schematically in FIG. 2 and FIGS. 7 to 11. Briefly described, it comprises a primary light source X1 directing a thin light beam 1 on the jar J, from which the beam may be diverted on the previously mentioned paths $s$ (stone), $b$ (blister), $l$ (lap) and $v$ (vertical line) respectively leading to one or two photocells. The photocells, meaning to include tubes as well as semi-conductor devices, are respectively V$s$ (stone), V$b$ (blister), V$l$1 and V$l$2 (lap) and V$v$ (vertical line), each connected to an amplifier circuit which will be described in detail. In addition, a ray $e$ is reflected directly back on the path 1 to a semi-reflector 51 at 45° to the path $e$, and is there reflected to an enable photocell V$e$. Reflection on the path $e$ occurs only when the primary pencil 1 strikes a vertical wall of the jar. The non-vertical neck and bottom portions are ignored.

Primary Light Source X1

Figure 7:
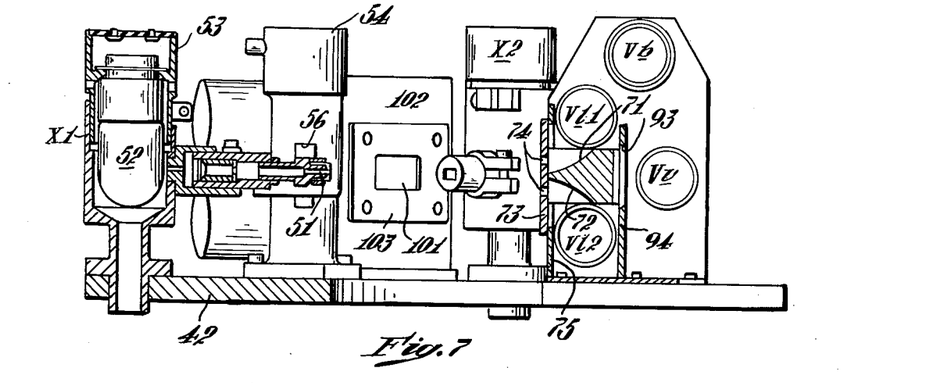
FIG. 7 is an elevation, partly in section, of the electro-optical inspection station of the machine.
Figure 8:
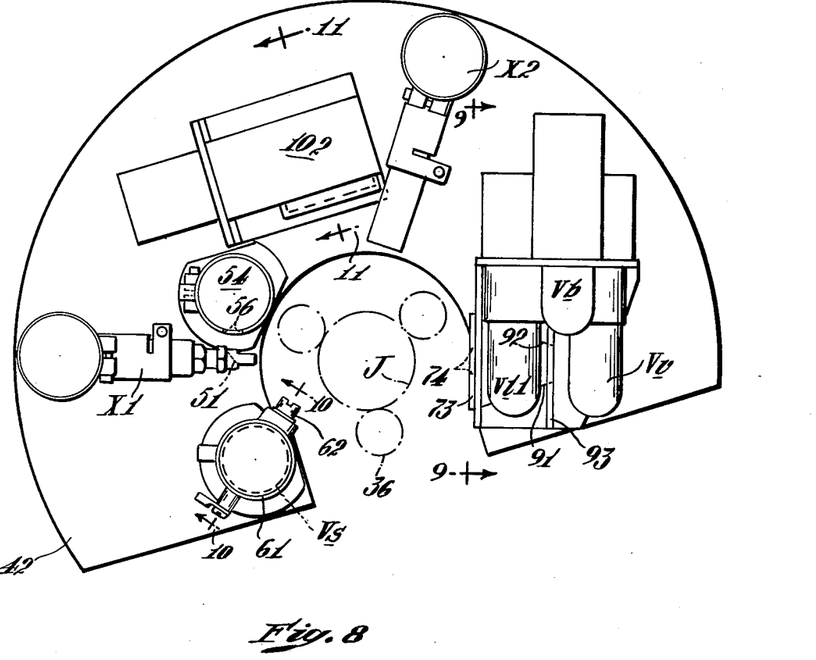
FIG. 8 is a plan view of the inspection station.

As shown in FIGS. 7 and 8, the primary light source is a lamp 52 enclosed in a ventilated housing 53 secured to the chassis 42. Opposite the lamp's filament is a lens barrel with lenses and masking slits which direct on the jar a collimated light beam. The light spot formed by the beam on the jar may have, for example, a vertical length of 0.10 inch parallel to the axis of the jar, and a horizontal width of 0.03 inch. Since the jar is fed 0.05 inch per revolution, the helical band scanned during one revolution slightly overlaps the subsequent band insuring that the entire vertical surface is scanned. The end of the lens barrel is located about 1 3/16 inches from the vertical wall of the jar.

Power Supply

Figure 12:
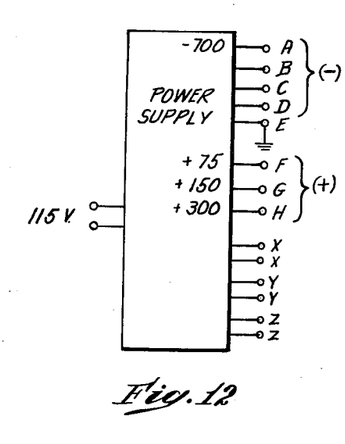
FIG. 12 is a block diagram of the power supply for the electro-optical inspection station.

In FIG. 12 is shown a conventional 115 v. input power supply having D.C. output voltages A, B, C, and D, negative with respect to ground E, and D.C. output voltages F, G, and H positive with respect to ground E, and filament voltages X, Y, and Z. The approximate voltages with respect to ground E are: A, −700, B, −550, C, −400, D, −250 F, +75, G, +150, H, +300. Any of voltages A to D may be used to supply the dynodes of the phototubes, the choice depending on the desired sensitivity. Voltages F to H are used to supply the operating voltages for the electronic tubes of the detectors. In addition, G supplies the anodes of the phototubes. Filament voltages X, Y, and Z are all approximately 6.3.

The Enable Function

As previously mentioned, the vertical sidewall of the jar reflects an intense beam from the jar directly back on the incident beam 1 to a reflector 51 and thence on a path $e$. Light on path $e$ is admitted through an aperture 56 to a housing 54 at the edge of the chute and causes the photocell V$e$ to respond by high conduction when the vertical jar wall is scanned by the incident beam 1. The gross departures from the vertical at the jar neck and bottom scatter the light so that the photocell response drops radically.

Figure 13:
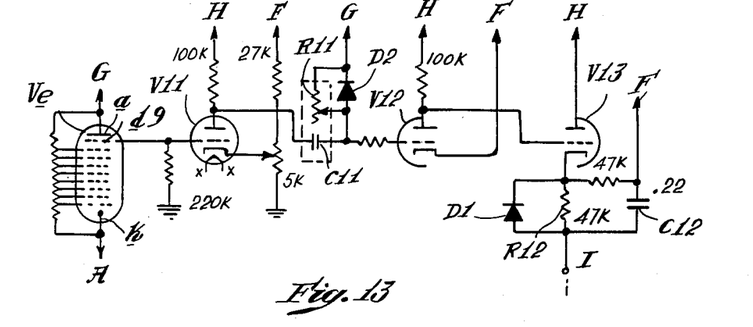
FIGS. 13 to 18 are schematic diagrams of the electronic circuits associated with the electro-optical inspection station.

The output of the photocell V$e$ is applied to an enable amplifier shown in FIG. 13. In this figure, as in FIGS. 14 to 18, typical values of the resistive and capacitative circuit elements are shown where the elements are not identified by reference characters, and connections to external circuits are identified by lettered arrowheads or terminal symbols.

A current signal from the enable photocell V$e$ is taken from its last dynode $d9$ and applied to the control grid of one half of a type 12AT7 tube V11, normally biased below cutoff by a voltage divider comprising a 27K resistor and a 5K potentiometer.

The following stage V12 is also one half of a type 12AT7 tube but is normally conducting by virtue of positive bias obtained from the 150 volt positive terminal G of the power supply. Stages V11 and V12 are coupled through a condenser C11, which is normally charged to 150 volts, or the potential difference between G and H of the power supply. The signal causes stage V11 to conduct which in turn causes the grid of stage V12 to go negative. Condenser C11 will slowly discharge through the 1 megohm adjustable resistor R11 until the grid of stage V11 again reaches a potential where it will conduct. The values of C11 and R11, e.g. 1 microfarad and 1 megohm respectively, are such as to hold the control grid of stage V12 negative for only the approximately 1 second's time required to scan the vertical jar wall, even though stage V11 will be conducting for the somewhat longer time required for the neck of the jar also to pass through the light beam. The function of diode D2 is to quickly charge condenser C11 as soon as stage V11 ceases to conduct.

The following stage V13, one half a type 12AT7 tube, is normally cut off by conduction of stage V12, and when stage V12 is cut off, the voltage at the control grid of stage V13 rises abruptly causing stage V13 to reach maximum conduction. Stage V13 is in series with the positive voltage terminal H and a plate supply terminal I for each of the other photocells shown in FIG. 14.

Figures 14, 15:
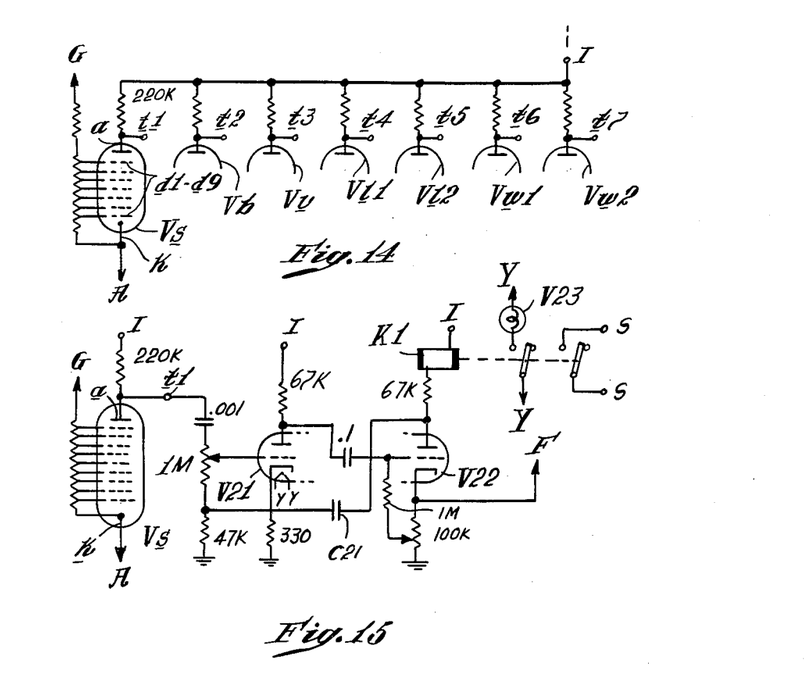

Terminal I is normally at approximately 75 volts positive by virtue of its connection to supply terminal F through the two 47 kilohm resistors, and this is the voltage appearing at the anodes of each of the phototubes V$s$, V$b$, V$l$1, V$l$2, V$w$1, and V$w$2. The dynode $d9$ of each of these tubes is at a higher potential by virtue of being connected to supply terminal G. Hence no current will flow from the anode to the dynode $d9$. When stage V13 conducts, the voltage at terminal I becomes more positive by virtue of the voltage drop across the cathode resistor, bringing the anode voltage of each phototube above that of the last dynode.

A filter in the output circuit comprising a 47 kilohm resistor R12 and a .22 microfarad capacitor C12 prevents a rapid rise of voltage at terminal I which otherwise would cause a pulse which the detector photocells might detect as a flaw. The function of diode D1 (1N461) is to hasten the discharge of the .22 microfarad capacitor at the end of the scanning period.

The flaw detecting photocells, shown in FIG. 14, are type 931A, having an anode $a$, nine dynodes $d1$ to $d9$ and a cathode $k$. The anode voltage controlled by the enable circuit of FIG. 13 is applied in each case through a 220 kilohm resistor. Each photocell has a conventional voltage divider connected between the 150 volt positive supply terminal G and the 700 volt negative supply terminal A to provide voltage steps of approximately 85 volts per stage, the cathode in each case being connected to the 700 volt negative terminal A. The photocells $Vs$, $Vb$, $Vv$, $Vl1$, $Vl2$, $Vw1$ and $Vw2$ have output terminals $t1$ to $t7$ respectively.

From the foregoing description, it is apparent that the several photocells can apply no signal to their respective output terminals unless the vertical wall of the jar has activated the enable circuit and caused it to supply anode voltage to the anodes of the flaw-detecting photocells.

*Stone Detection*

Figure 10:
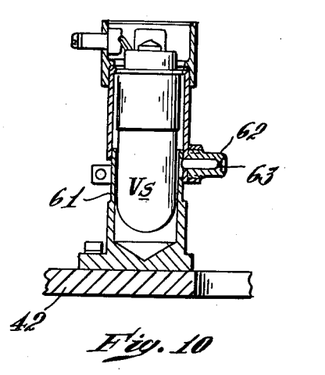
FIG. 10 is a section on line 10—10 of FIG. 8.

As shown in FIGS. 2, 8 and 10, the lenticular area caused by an embedded stone causes reflection of the incident light beam 1 on a wide angle including the path $s$ leading to the stone-detecting photocell $Vs$. The photocell $Vs$ is enclosed in a housing 61 on the chassis 42. The housing carries a short barrel extending from the photocell $Vs$ and terminating in a member 62 forming an aperture 63 about 5/32" in diameter. The axis of the barrel is on the path $s$ at an angle of about 40° to the incident light beam 1, and the aperture is disposed close (about one-half inch) to the jar J, the photocathode of the photocell $Vs$ being about 1½ inches from the jar. While other defects will cause some reflection, it will not be so intense at angles such as that of the path $s$. Substantial reflection from parts of the jar other than the spot being scanned is avoided by the location of the small aperture 63 close to the jar.

Figure 5:
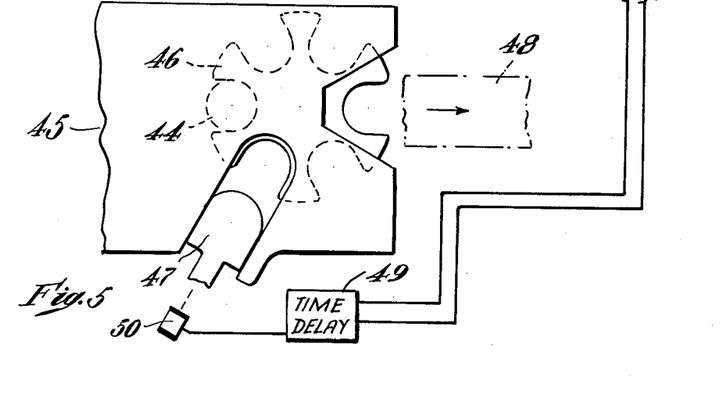
FIG. 5 is a partial underside view of the machine of FIG. 3.

When the incident beam 1 strikes a stone, a short flash of light is reflected on the photocell $Vs$ whose associated circuit is shown in FIG. 15. Momentary conduction of the photocell $Vs$ applies a short negative pulse through its output terminal $t1$ to the first stage V21 of a conventional two-stage, resistance, capacitance coupled amplifier. The first and second stages V21 and V22 each comprise one-half a type 12AT7 tube. Stage V21 is normally conducting and stage V22 is normally cut off by positive cathode voltage supplied by current from power terminal F flowing through a 100K cathode resistor. The negative pulse initiated by a flaw is applied to the control grid of stage V21 and cuts off the first stage, which then applies a positive pulse to the control grid of the second stage V22 causing it to conduct. On conduction, a negative swing of voltage at the anode of stage V22 is coupled through a 0.5 microfarad capacitor C21 to the control grid of the first stage V21 thereby lengthening the time which stage V21 is cut off and stage V22 conducts to about ⅕ second. In series with the second stage V22 is a relay K1 which is held energized for this time. The relay contacts complete circuits through an indicator lamp V23 and control terminals S. The control terminals S are connected to the time delay 49 which activates the rejection device 47 at the bottom of the inspection chute (FIGS. 3 and 5). Like relay contacts of the flaw-detection circuits to be described are connected in parallel with the control terminals S of the stone-detection amplifier. Thus, on detection of any of the stone or other described flaws, the rejection device will be actuated when the defective jar has arrived at the rejection device.

*Blister Detection*

As shown in FIGS. 2, 7, 8 and 9, the photocell $Vb$ for detecting blisters is located approximately 23° to one side and 30° above a projection of the incident beam 1. In this position, the photocell is within the cone of intense light refracted forwardly by the lense effect of the small air bubble defect. As previously mentioned, a stone primarily reflects while a horizontal lap, vertical line or washboard primarily refract in a relatively narrow horizontal or vertical zone. Thus, the path $b$ on which the beam is refracted by a blister lies outside the refraction paths of the vertical and horizontal defects, and path $b$ receives very little light by refraction from a stone or from minor defects.

As in the case of a stone, a blister directs a momentary flash of light on the blister-detecting photocell $Vb$ causing it to conduct momentarily. Associated with the photocell $Vb$ is an amplifier circuit like that of FIG. 15. Again a short pulse is amplified and stretched to hold a control relay energized for approximately ⅕ second and apply a signal to the time delay.

*Horizontal Lap Detection*

As shown in FIGS. 2, 7, 8 and 9, a horizontal lap primarily refracts the incident beam both upwardly and downwardly in a vertical zone with relatively little horizontal spread, and is best detected by two vertically spaced photocells $Vl1$ and $Vl2$. The photocells lie on two folded paths $l$ which originate within the vertical zone and which are bent up and down by parabolic mirror surfaces 71 and 72. The mirror surfaces are masked from light deflected by other flaws by a plate 73 secured to a bracket 75 upstanding from the chassis 42. The plate 73 has two vertically spaced apertures 74 lying on the paths $l$ and passing primarily only light deflected by a horizontal lap, so that the vertically deflected beams will strike both of the lap-detecting cells $Vl1$ and $Vl2$. By way of example, the mask 73 may lie approximately 2 inches from the center line of the jar. The apertures are spaced about ½ inch apart and are approximately 0.1 inch in height and ¼ inch in width.

Figure 18:
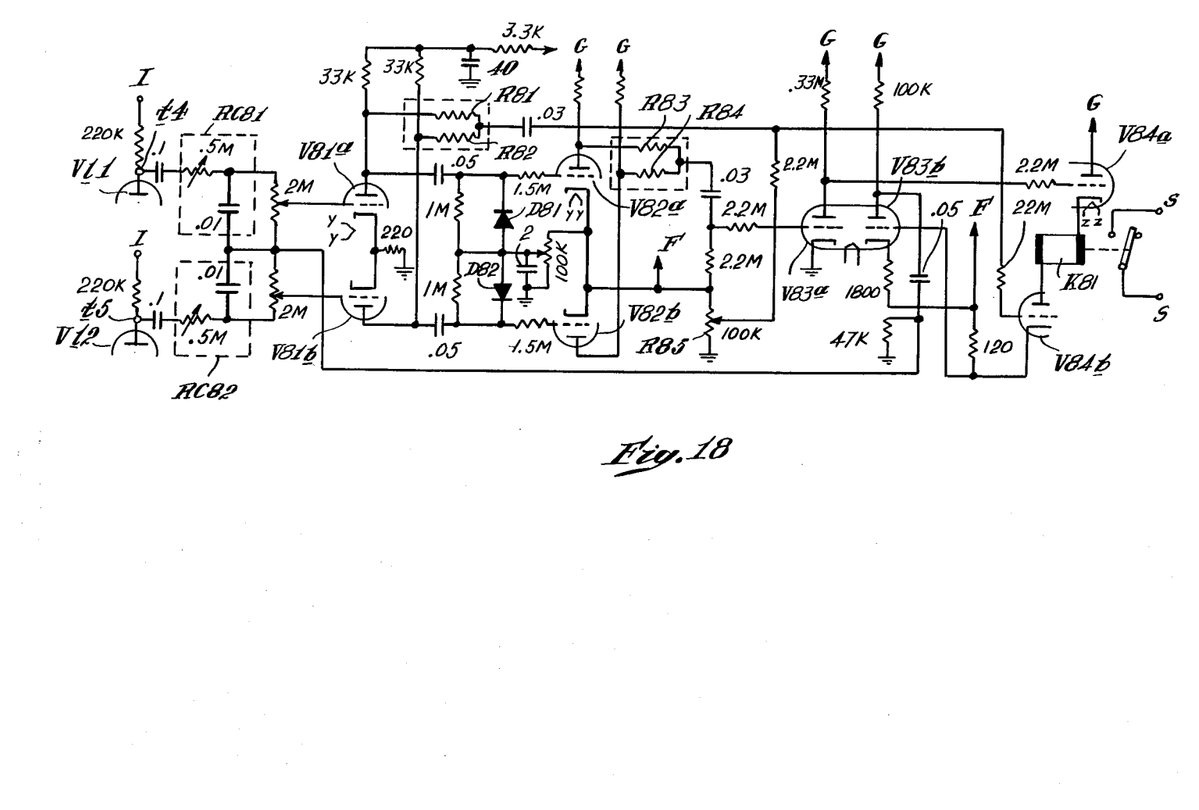

The lap photocells $Vl1$ and $Vl2$ are connected to an amplifier circuit shown in FIG. 18. The circuit requires that each photocell must receive light above a certain intensity and that the sum or average of the two must exceed a predetermined minimum before the circuit will cause a rejection of the jar under test.

The respective lap photocells, when caused to conduct by a light pulse, apply negative pulses to the control grids of amplifier stages V81$a$ and V81$b$, each one-half a type 6SN7 tube. The pulses are integrated by networks RC81 and RC82 which discriminate between long laps and short laps, the networks passing only long lap signals. The stages V81$a$ and V81$b$ are adjusted for normal conduction at the same level by 2 megohm potentiometers. When cut off by the long lap pulse, they apply a positive voltage to the control grids of stages V82$a$ and V82$b$, each comprising one-half of a 6SL7 tube normally biased below cutoff by a cathode biasing, 100K potentiometer R85, by means of which the threshold may be adjusted. Diodes D81 and D82 (type 1N461) serve as D.C. restorers for the bias circuit.

The two negative outputs at the anodes of the stages V82$a$ and V82$b$ are averaged by 1.2 megohm resistors R83 and R84 and the resultant mean pulse applied to the control grid of stage V83$a$, one-half a type 6SL7 tube normally conducting at saturation. The circuit constants are such that this stage will not operate below cutoff unless both of stages V82$a$ and V82$b$ are conducting. If stage V83$a$ is cut off, a subsequent stage V84$a$ is allowed to conduct.

Stage V84$a$ is in series with a control relay K81 and a stage V84b, both V84a and V84b being one half of a type 12AT7 tube. Both halves must conduct to energize the relay. The second half V84b is caused to conduct by cutoff of the input stages V81a and V81b. The resultant positive swing at the anodes of stages V81a and V81b is applied through averaging resistors R81 and R82, each 1 megohm, and the combined signal applied to the control grid of stage V84b.

When both stages V84a and V84b are conducting, current in the 120 ohm cathode resistor of stage V84b causes a negative voltage swing at the cathode of a feedback stage V83b, increasing its conduction and applying a negative feed-back pulse through an 0.05 microfarad capacitor to the grids of the input stages V81a and V81b. The time delay involved in this feed-back holds the relay K81 energized for approximately ⅕ second.

*Vertical Line Detection*

Figure 9:
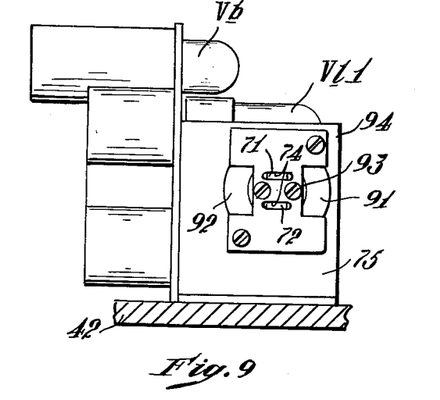
FIG. 9 is a section on line 9—9 of FIG. 8.

Vertical lines or marks are detected by the apparatus and circuit shown in FIGS. 2, 7, 8 and 9. The incident beam 1 is spread by the mark primarily in a horizontal zone with a vertical width so small that appreciable light from the mark does not extend upwardly to the apertures which admit light from a horizontal lap. However, the horizontal spread of the zone is sufficient so that paths $v$ pass to either side of the approximately 1 inch wide mask 73. Beyond the mask 73 are reflectors 91 and 92 converging on an aperture 93 in an upright plate 94. The reflectors 91 and 92 are preferably curved as shown in FIG. 9, but may be planar as shown schematically in FIG. 2. These reflectors bend the light paths $v$ so that they pass through the aperture to the vertical mark-detecting photocell Vv. Only light momentarily deflected right or left causes the photocell to conduct.

Figure 16:
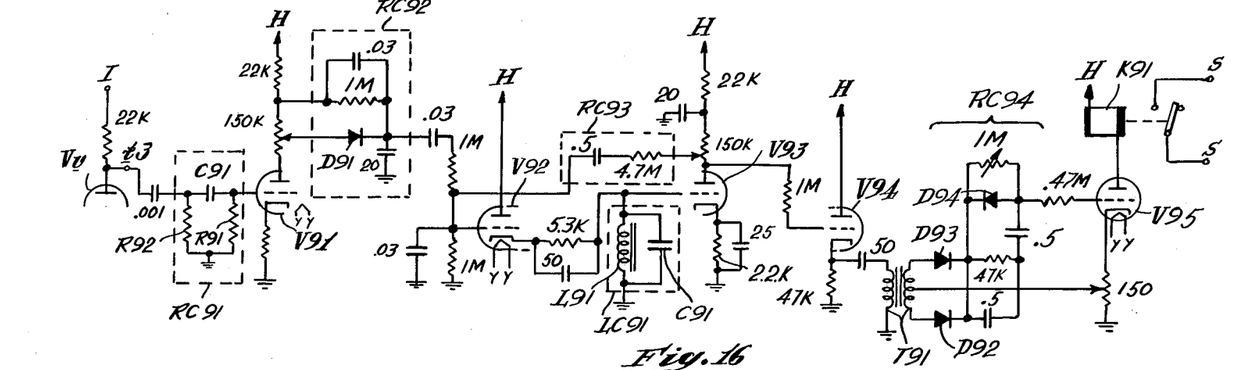

The associated circuit is shown in FIG. 16. The negative pulse at the anode of the photocell Vv is applied through a resistor-capacitor network RC91 to the grid of an input stage V91, one half of a type 6SL7 tube, normally conducting as a conventional linear amplifier. The network RC91 comprising two 1 megohm resistors R91 and R92 and a .001 microfarad capacitor C91 filters out low frequency signals such as might be caused by ordinary variation in thickness of the jar wall. On the other hand, the network passes pulses of short rise time such as are caused by the momentary refraction of a vertical mark.

The amplified output of the input stage V91 is coupled through a tuned circuit RC92 which serves to accentuate the rotational frequency of the jar and hence of the vertical mark pulses. The network thus discriminates against similar pulses caused by the two vertical mold marks, which pulses occur at twice the frequency of the vertical mark pulses. Further, the tuned network accentuates the sharpness of the mark pulses so that the out of phase mold pulses are subtractive rather than spuriously additive.

The sharpened negative pulse is applied to the grid of the second stage V92, one half a type 6SN7 tube. The second stage V92 is a linear amplifier whose sensitivity is adjusted by a 150 kilohm potentiometer at the anode of stage V91. A resonant circuit LC91 in the cathode circuit comprises an inductance L91, commercially available as Freed No. QGC4 and having an inductance of approximately 25 henries, and an adjustable capacitor C91 having a capacitance of approximately 1 microfarad. The resonant frequency of this circuit is tuned to the frequency of the mark pulses. Signal voltage for the following stage is taken from across this tuned circuit, frequencies other than the mark frequency being thus effectively filtered out. The third stage V93, one half a 6SL7, amplifies linearly the filtered signal and applies positive feed-back to the grid of the preceding stage V92 through a feed-back loop RC93. The level of feedback may be adjusted by a 150 kilohm potentiometer in the anode circuit of stage V93. The positive feed-back stretches the pulses and increases the selectivity of the resonant circuit RCL91.

The pulse signal is also applied from the anode of stage V93 to a conventional linear amplifier V94. The cathode output of stage V94 is applied through a pulse transformer T91, available as Triad No. A40J, to full wave rectifiers D92 and D93, type 1N461 diodes. The rectified pulse signal is integrated in a network RC94 including a type 1N461 diode D94. The network integrates the resulting positive pulse series so as to discriminate against short series of pulses representing a short and harmless vertical mark. The diode removes any negative swing of the resultant long positive pulse which is applied to the grid of the final stage V95. The final stage, a type 6SL7 tube, is biased below cutoff by a 150 ohm potentiometer in the cathode circuit, and conducts only on a positive pulse passed by the network RC94. Thus, only a vertical mark of substantial length can trigger the final stage and energize the control relay K91.

*Washboard Detection*

A washboard comprising a series of parallel horizontal lenticules scatters light in a vertical zone similarly as does a single horizontal lap, but differs in that the scattering occurs in a number of successive revolutions of the jar.

As shown in FIGS. 2, 7 and 8, a separate source X2 of colored or filtered light directs a secondary scanning beam 2 on the jar J. While the primary source X1 may be used to scan a washboard and the reflected beam and resultant signal differentiated optically from a lap, preferably the two sources X1 and X2 emit light in different portions of the light spectrum from ultraviolet through visible to infrared light. For example, source X1 may project a filtered orange-yellow light, and source X2 a blue-violet light. As in the case of a horizontal lap, two paths $w$ define the angle within which the washboard reflects light both upwardly and downwardly. The paths $w$ pass through a blue-violet filter 101 which transmits substantially only the light of the source X2. Thus when source X1 is of a different color than that passed by the filter, light from source X1 which is reflected by flaws or irregularities will be rejected by the filter. If the secondary source X2 emits ultraviolet (source X1 emitting only visible light), such light will be reflected only from outside surface flaws, and other flaws inside the jar will not thereby be detected.

Figure 11:
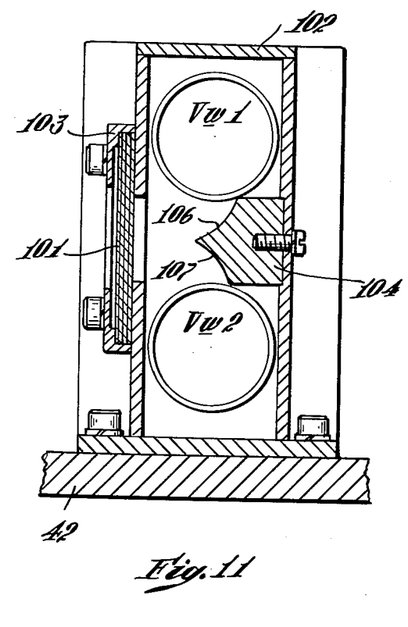
FIG. 11 is a section on line 11—11 of FIG. 8.

As shown in FIGS. 7, 8 and 11, the washboard-detecting photocells Vw1 and Vw2 are mounted one above the other in a housing 102. Opposite the jar J is a frame 103 holding the filter 101. Within the housing and between the photocells is a block 104 having parabolic reflecting surfaces 106 and 107. A beam on one of the general paths $w$ is reflected upwardly to photocell Vw1 and the other downwardly to photocell Vw2.

Figure 17:
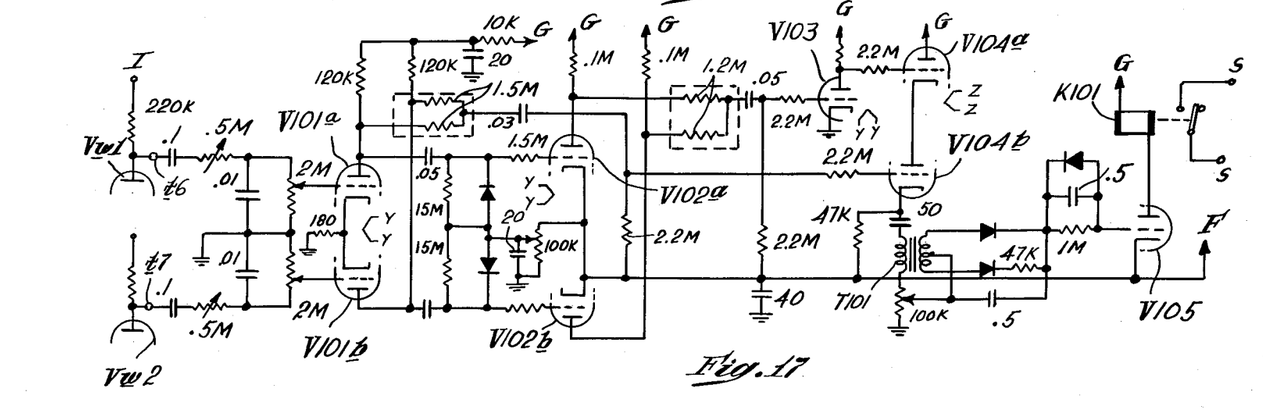

The washboard detection circuit of FIG. 17, like the lap circuit of FIG. 18, operates to reject a jar only when both photocells conduct during several revolutions, that is, when the area of the washboard is substantial.

The first two 6SL7 stages V101a—V101b and V102a—V102b of the washboard amplifier are identical with those of the lap detector of FIG. 18. The two photocell signals applied to the input stages are integrated and amplified, and the output of both the first and second stages are averaged. The negative averaged output of the second stage V102a—V102b is applied to a normally conducting third stage V103, one half a type 12AT7 tube, causing this stage to be cut off and to apply a positive pulse to the grid of the subsequent stage V104a, one half a type 12AT7 tube. This stage V104a is in series with a like stage V104b and the primary of a pulse transformer T101. When both normally cutoff series stages V104a and V104b conduct, voltage developed across a 47 kilohm resistor at the cathode of stage V104b is applied to the primary.

The series stage V104b is caused to conduct by the positive, averaged output of the first stage V101a—V101b. With both tubes conducting for the length of time to scan a sizeable washboard, a long positive pulse is coupled through the transformer T101 to full-wave rectifying and integrating circuits like those described as to FIG. 16. The final normally cutoff stage V105, one half a 12AT7, supplies current to the control relay K101, whose switching contacts are in parallel with all of the previously described relay contacts.

*Summary*

From the foregoing detailed description of the optical inspection apparatus and associated circuits, it can be seen that the present invention differentially detects light diverted in particular ways from particular flaws and ignores light diverted from inconsequential imperfections or light diverted with low intensity from a particular flaw. For example, intense light reflected in a solid angle from a stone can be differentiated by masking light from other flaws which is not intense in the solid angle. Where light is refracted in a horizontal zone by a mark, or in a vertical zone by a lap, rather than the conical zone of a blister, the middle parts of the long, narrow zones may be masked and light passing through both ends of the zone will be peculiar to the horizontal or vertical flaw and of greater intensity than that from the blister.

Further the size and repetitive characteristics of vertical marks and washboards may be used to distinguish them from other flaws and minor defects by selection of modulation characteristics. In the case of the washboard flaw it is preferable to use a different colored light source and to filter the deflected beams. However, a single light source may be used and the differentiation carried out purely electronically.

The electronic differentiation extends to the size of the flaw, narrow or short vertical marks or horizontal laps, and washboards of small area being ignored. Further a flaw like a vertical mark may be repeatedly scanned as the jar is fed downwardly so as to modulate the scanning beam with a repetition rate or frequency equal to the rate of rotation of the jar. A signal with a particular repetition rate can also be selected electronically.

It should be understood that the present disclosure is for the purpose of illustration only and that this invention involves all modifications and equivalents which fall within the scope of the appended claims. For example, while helical scanning is shown and described other scanning patterns may be employed.

What is claimed is:

1. The method of differentially detecting one of two or more types of flaws in the wall of a transparent container at a station, comprising projecting a narrow beam of light on the container, producing relative motion between said container and the beam thereby to scan said wall with said beam, flaws of different types diverting the beam on different predeterminable paths, preventing the light diverted on one path from overlapping the other path, and detecting the beam on said one path at said station, thereby to detect one diverted beam independently of the other.

2. The method of differentially detecting one of two or more types of flaws in the wall of a transparent container at a station, comprising projecting a narrow beam of light on the container, producing relative motion between said container and the beam thereby to scan said wall with said beam, flaws of different types diverting the beam on different predeterminable paths, preventing the light diverted on one path from overlapping the other path, and detecting the beams on the different paths at said station, thereby to detect each diverted beam independently.

3. The method of differentially detecting one of two or more types of flaws in the wall of a transparent container at a station, comprising projecting a narrow beam of light on the container, producing relative motion between said container and the beam thereby to scan said wall with said beam, flaws of different types diverting the beam on different predeterminable paths, the paths from one flaw lying primarily in one zone and the paths from another flaw lying within and primarily without said zone, and detecting only light lying on a path within said zone at said station, thereby to detect one diverted beam independently of the other.

4. The method of differentially detecting one of two or more types of flaws in the wall of a transparent container at a station, comprising projecting a narrow beam of light on the container, producing relative motion between said container and the beam thereby to scan said wall with said beam, flaws of different types diverting the beam on different predeterminable paths, the paths from one flaw lying primarily within a solid angle and the paths from another flaw lying within and primarily without said angle, obstructing light on paths outside said solid angle and detecting only light lying on a path within said angle at said station, thereby to detect one diverted beam independently of the other.

5. The method of differentially detecting one of two or more types of flaws in the wall of a transparent container at a station, comprising projecting a narrow beam of light on the container, producing relative motion between said container and the beam thereby to scan said wall with said beam, flaws of different types diverting the beam on different predeterminable paths, the paths from one flaw lying primarily within a zone having a long, narrow cross section and the paths from another flaw lying within and primarily without said zone, obstructing light on paths through the middle and outside said zone, and detecting only light lying on two paths passing through the ends of said zone at said station, thereby to detect light from one flaw independently of light from the other.

6. The method of differentially detecting one of two or more types of flaws in the wall of a transparent container at a station, comprising projecting two narrow beams of light on the container, producing relative motion between said container and the beams thereby to scan said wall with said beams, flaws of different types diverting the beams on different predeterminable paths, preventing the light of one diverted beam from overlapping light of the other diverted beam, and detecting only the light of one diverted beam at said station, thereby to detect one flaw independently of the other.

7. The method of differentially detecting one of two or more types of flaws in the wall of a transparent container at a station, comprising projecting a narrow beam of light on the container, producing relative motion between said container and the beam thereby to scan said wall with said beam, flaws of different types diverting the beam on different predeterminable paths with different modulation characteristics, preventing the light diverted on one path from substantially overlapping the other path, detecting the beam on said one path at said station thereby to produce an electric signal having said different modulation characteristics, and selecting only that part of the signal having a particular modulation characteristic, thereby to detect one flaw independently of the other.

8. Inspection apparatus for differentially detecting one of two or more types of flaws in the wall of a transparent container at a station, comprising optical means for projecting a narrow beam of light on the container, means producing relative motion between said container and optical means thereby to scan said wall with said beam, flaws of different types diverting the beam on different predeterminable paths, at least two photoelectric detecting means, at said station each on a different path, and masking means in at least two of said paths passing light on only one path preventing light diverted to one detecting means from reaching the other detecting means.

9. Inspection apparatus for differentially detecting one of two or more types of flaws in the wall of a transparent container at a station, comprising optical means for projecting a narrow beam of light on the container, means producing relative motion between said container and optical means thereby to scan said wall with said beam, flaws of different types diverting the beam on predeterminable paths in different overlapping zones, photoelectric detecting means in one of said zones at said station, and means masking the over-lapping portion of said zones and passing light primarily only in one zone thereby to prevent light in another zone from reaching the detecting means in said one zone, so that the detecting means in said one zone detects a particular flaw.

10. Inspection apparatus for differentially detecting one of two or more types of flaws in the wall of a transparent container at a station, comprising optical means for pojecting a narrow beam of light on the container, means producing relative motion between said container and optical means thereby to scan said wall with said beam, flaws of different types diverting the beam on different predeterminable paths, the light paths from one flaw lying primarily in a zone having a long narrow cross section, means masking all but the ends of said zone, and photoelectric detecting means beyond said ends respectively at said station, and circuit means responsive only when light falls on both of said photoelectric means.

11. Inspection apparatus for detecting one of two or more types of flaws in the wall of a transparent container at a station, comprising means for projecting a narrow beam of light on the container wall, means producing between said container and projecting means relative rotational motion about an axis and relative linear motion along said axis thereby repeatedly to scan said wall with said beam, flaws of different types diverting said beam with modulations of different characteristics, photoelectric detecting means in one of said paths at said station for converting beam modulations into electrical signals of like characteristic, and circuit means connected to said detecting means including means selecting only signal modulations of one characteristic, thereby differentially to detect one type of flaw, and means utilizing said selected signal to identify a container with a flaw.

12. Inspection apparatus for differentially detecting one of two or more types of flaws in the wall of a transparent container at a station, comprising optical means for projecting a narrow beam of light on the container, means producing relative motion between said container and optical means thereby to scan said wall with said beam, flaws of different types diverting the beam with modulation of different characteristics, photoelectric detecting means in one of said paths at said station for producing an electrical signal with characteristics like that of the diverted beam, circuit means connected to said detecting means including means selecting only a signal of one characteristic thereby differentially to detect one type of flaw, and means utilizing the selected signal so as to identify a container having a flaw.

13. Inspection apparatus for differentially detecting one of two or more types of flaws in the wall of a transparent container at a station, comprising optical means for projecting a narrow beam of light on the container, means producing relative motion between said container and optical means thereby to scan said wall with said beam, flaws of different types diverting the beam with modulation of different rise times, photoelectric detecting means in one of said paths at said station for producing an electrical signal with a rise time dependent on that of the diverted beam, circuit means connected to said detecting means including means selecting only a signal of short rise time thereby differentially to detect one type of flaw, and means utilizing the selected signal so as to identify a container having a flaw.

14. Inspection apparatus for differentially detecting one of two or more types of flaws in the wall of a transparent container at a station, comprising optical means for projecting a narrow beam of light on the container, means producing relative motion between said container and optical means thereby repeatedly to scan said wall with said beam, flaws of one type repeatedly modulating said beam at the scanning repetition rate, photoelectric detecting means in one of said paths at said station for producing an electrical signal with the same and other repetition rates, circuit means connected to said detecting means including means selecting only a signal of a particular repetition rate thereby differentially to detect one type of flaw, and means utilizing the selected signal so as to identify a container having a flaw.

15. Inspection apparatus for differentially detecting one of two or more types of flaws in the wall of a transparent container at a station, comprising optical means for projecting a narrow beam of light on the container, means producing relative motion between said container and optical means thereby repeatedly to scan said wall with said beam, flaws of one type repeatedly modulating said beam during an interval, photoelectric detecting means in one of said paths at said station for producing an electrical signal with characteristics like that of the diverted beam, circuit means connected to said detecting means including integrating means selecting only a signal repeated for a predetermined interval differentially to detect large flaws of one type, and means utilizing the selected signal so as to identify a container having a large flaw.

16. Inspection apparatus for differentially detecting one of two or more types of flaws in the wall of a transparent container, comprising optical means for projecting a narrow beam of light on the container, means producing relative motion between said container and optical means thereby to scan said wall with said beam, flaws of different types diverting the beam with modulation of different characteristics, photoelectric detecting means in one of said paths for producing an electrical signal with characteristics like that of the diverted beam, circuit means connected to said detecting means including at least two successive amplifier stages and two electronic control valves in series with a control relay, respective amplifiers being connected to and separately controlling said control valves, and means controlled by said relay to identify a container having a flaw.

17. Inspection apparatus for differentially detecting one of two or more types of flaws in the wall of a transparent container, comprising optical means for projecting a narrow beam of light on the container, means producing relative motion between said container and optical means thereby to scan said wall with said beam, flaws of different types diverting the beam with modulation of different characteristics, photoelectric detecting means in one of said paths for producing an electrical signal with characteristics like that of the diverted beam, circuit means means connected to said detecting means including means selecting only a signal of one characteristic thereby differentially to detect one type of flaw, said circuit means including an amplifier channel having at least two amplifier stages and a positive feedback circuit between said stages, and relay means energized by said signal so as to identify a container having a flaw, said feedback lengthening the interval of said signal thereby to hold said relay means energized for a predetermined period.

18. Apparatus according to claim 17 characterized by a resonant circuit connected between said amplifiers for selecting signals of a predetermined signal, said feedback circuit increasing the selectivity of said resonant circuit.

19. Inspection apparatus for differentially detecting one of two or more types of flaws in the wall of a transparent container, comprising optical means for projecting a narrow beam of light on the container, means producing relative motion between said container and optical means thereby to scan said wall with said beam, flaws of different types diverting the beam on different paths, two photoelectric detecting means in one of said paths for producing two electrical signals whose amplitude is dependent on the diverted beam, circuit means connected to respective detecting means, said circuit means including two amplifying channels respectively connected to said detecting means and a network for averaging the signals of the two channels, and relay means coupled to said network including means responsive only when both signals exceed a predetermined amplitude.

References Cited in the file of this patent

UNITED STATES PATENTS

| | | |
|---|---|---|
| 1,940,882 | Rich | Dec. 26, 1933 |
| 2,132,447 | Stout | Oct. 11, 1938 |
| 2,318,856 | Hoffman | May 11, 1943 |
| 2,454,411 | Stoate | Nov. 23, 1948 |
| 2,524,929 | Razek | Oct. 10, 1950 |
| 2,531,529 | Price | Nov. 28, 1950 |
| 2,593,127 | Fedorchak | Apr. 15, 1952 |
| 2,868,061 | Fedorchak et al. | Jan. 13, 1959 |